(12) United States Patent
Inoue et al.

(10) Patent No.: US 7,680,972 B2
(45) Date of Patent: Mar. 16, 2010

(54) MICRO INTERRUPT HANDLER

(75) Inventors: Keisuke Inoue, Kanagawa (JP); Masahiro Yasue, Kanagawa (JP)

(73) Assignee: Sony Computer Entertainment Inc. (JP)

( * ) Notice: Subject to any disclaimer, the term of this patent is extended or adjusted under 35 U.S.C. 154(b) by 561 days.

(21) Appl. No.: 11/345,893

(22) Filed: Feb. 2, 2006

(65) Prior Publication Data

US 2006/0179198 A1 Aug. 10, 2006

Related U.S. Application Data

(60) Provisional application No. 60/650,270, filed on Feb. 4, 2005.

(51) Int. Cl.
*G06F 13/24* (2006.01)

(52) U.S. Cl. .......................................... 710/260; 713/2

(58) Field of Classification Search ......... 710/260–261, 710/269; 713/2
See application file for complete search history.

(56) References Cited

U.S. PATENT DOCUMENTS

| | | | |
|---|---|---|---|
| 4,247,894 | A | 1/1981 | Beismann et al. |
| 4,574,350 | A | 3/1986 | Starr |
| 4,636,944 | A | 1/1987 | Hodge |
| 4,716,523 | A | 12/1987 | Burrus, Jr. et al. |
| 4,736,319 | A | 4/1988 | DasGupta et al. |
| 4,751,634 | A | 6/1988 | Burrus, Jr. et al. |
| 4,794,526 | A | 12/1988 | May et al. |
| 4,901,234 | A | 2/1990 | Heath et al. |
| 4,908,750 | A | 3/1990 | Jablow |
| 4,954,948 | A | 9/1990 | Hira et al. |
| 4,980,820 | A | 12/1990 | Youngblood |
| 4,987,529 | A | 1/1991 | Craft et al. |
| 5,003,466 | A | 3/1991 | Schan, Jr. et al. |
| 5,083,258 | A | 1/1992 | Yamasaki |
| 5,088,022 | A | 2/1992 | Iwata |
| 5,099,414 | A | 3/1992 | Cole et al. |
| 5,109,329 | A | 4/1992 | Strelioff |
| 5,111,425 | A | 5/1992 | Takeuchi et al. |
| 5,146,597 | A | 9/1992 | Williams |

(Continued)

FOREIGN PATENT DOCUMENTS

EP 0 602 858 A 6/1994

(Continued)

OTHER PUBLICATIONS

Furman, Roy, "Interrupt handling with VxDs optimizes mulitasking OS" Personal Engineering, Jan. 1996.

(Continued)

*Primary Examiner*—Clifford H Knoll
(74) *Attorney, Agent, or Firm*—Lerner, David, Littenberg, Krumholz & Mentlik, LLP

(57) ABSTRACT

A system and method is provided for improved interrupt handling via a micro interrupt handler. Upon an interrupt signal being sent to a processor running a task, a first part of the running task is stored to system memory via direct memory access. A micro interrupt handler is read from the system memory to begin handling the interrupt signal. A second part of the running task is stored to system memory via direct memory access. The micro interrupt handler is executed and read and the previous running task is read from direct memory access and restored. Long lag times for interrupt processing and inefficiencies in processor queues are avoided.

19 Claims, 14 Drawing Sheets

U.S. PATENT DOCUMENTS

| | | | |
|---|---|---|---|
| 5,212,795 A | 5/1993 | Hendry |
| 5,247,671 A | 9/1993 | Adkins et al. |
| 5,257,375 A | 10/1993 | Clark et al. |
| 5,283,904 A | 2/1994 | Carson et al. |
| 5,291,609 A | 3/1994 | Herz |
| 5,379,381 A | 1/1995 | Lamb |
| 5,379,434 A | 1/1995 | DiBrino |
| 5,390,300 A | 2/1995 | Pribnow et al. |
| 5,452,452 A | 9/1995 | Gaetner et al. |
| 5,469,571 A | 11/1995 | Bunnell |
| 5,515,538 A | 5/1996 | Kleiman |
| 5,553,293 A | 9/1996 | Andrews et al. |
| 5,555,383 A | 9/1996 | Elazar et al. |
| 5,560,019 A | 9/1996 | Narad |
| 5,590,380 A | 12/1996 | Yamada et al. |
| 5,606,703 A | 2/1997 | Brady et al. |
| 5,613,128 A | 3/1997 | Nizar et al. |
| 5,652,848 A | 7/1997 | Bui et al. |
| 5,696,976 A | 12/1997 | Nizar et al. |
| 5,701,495 A | 12/1997 | Arndt et al. |
| 5,768,599 A | 6/1998 | Yokomizo |
| 5,777,629 A | 7/1998 | Baldwin |
| 5,794,072 A | 8/1998 | Nomura et al. |
| 5,822,595 A | 10/1998 | Hu |
| 5,875,343 A | 2/1999 | Binford et al. |
| 5,892,956 A | 4/1999 | Qureshi et al. |
| 5,907,712 A | 5/1999 | Slane |
| 5,944,800 A | 8/1999 | Mattheis et al. |
| 5,966,543 A | 10/1999 | Hartner et al. |
| 5,974,522 A | 10/1999 | Torng et al. |
| 5,995,745 A | 11/1999 | Yodaiken |
| 6,115,778 A | 9/2000 | Miyake et al. |
| 6,148,361 A | 11/2000 | Carpenter et al. |
| 6,199,124 B1 | 3/2001 | Ramakrishnan et al. |
| 6,219,741 B1 | 4/2001 | Pawlowski et al. |
| 6,275,749 B1 | 8/2001 | Saville et al. |
| 6,289,369 B1 | 9/2001 | Sundaresan |
| 6,347,349 B1 | 2/2002 | Neal et al. |
| 6,385,638 B1 | 5/2002 | Baker-Harvey |
| 6,418,496 B2 | 7/2002 | Pawlowski et al. |
| 6,430,643 B1 | 8/2002 | Arndt |
| 6,473,780 B1 | 10/2002 | Barcelo |
| 6,490,642 B1 | 12/2002 | Thekkath et al. |
| 6,601,120 B1 | 7/2003 | Schimmel |
| 6,606,676 B1 | 8/2003 | Deshpande |
| 6,615,342 B1 * | 9/2003 | Bopardikar et al. ......... 712/227 |
| 6,629,252 B1 | 9/2003 | Gholami et al. |
| 6,633,942 B1 | 10/2003 | Balasubramanian |
| 6,647,431 B1 | 11/2003 | Utas |
| 6,665,760 B1 | 12/2003 | Dotson |
| 6,691,268 B1 * | 2/2004 | Chin ......................... 714/726 |
| 6,701,405 B1 | 3/2004 | Adusumilli et al. |
| 6,813,665 B2 | 11/2004 | Rankin et al. |
| 6,920,516 B2 | 7/2005 | Hartwell et al. |
| 7,272,664 B2 * | 9/2007 | Arimilli et al. .............. 709/250 |
| 7,328,294 B2 * | 2/2008 | Kim et al. .................. 710/260 |
| 2004/0111552 A1 * | 6/2004 | Arimilli et al. .............. 711/100 |
| 2005/0120147 A1 | 6/2005 | Koyama |
| 2006/0179198 A1 | 8/2006 | Inoue et al. |
| 2006/0206634 A1 | 9/2006 | Torisaki et al. |
| 2007/0288729 A1 * | 12/2007 | Erb ........................... 712/234 |

FOREIGN PATENT DOCUMENTS

| | | |
|---|---|---|
| JP | 05-204867 | 8/1993 |
| JP | 07-160509 | 6/1995 |
| JP | 2001-306335 | 11/2001 |
| JP | 2004-078979 | 3/2004 |
| JP | 2005-004562 | 1/2005 |
| JP | 07-160656 | 6/2007 |

OTHER PUBLICATIONS

Office Action from corresponding Japanese Application No. 2006-027778, dated Mar. 3, 2009.

* cited by examiner

Task T:

Handler A:

Prior Art Conventional Method 1:

Prior Art Conventional Method 2:

Present Method:

MICRO INTERRUPT HANDLER

CROSS-REFERENCE TO RELATED APPLICATIONS

This application claims the benefit of U.S. Provisional Application No. 60/650,270, filed Feb. 4, 2005, the disclosure of which is incorporated by reference herein.

The invention disclosed and claimed in this application was made as a result of activities undertaken within the scope of a joint research agreement among Sony Computer Entertainment Inc., Toshiba Corporation and International Business Machines Corporation executed Mar. 9, 2001. The field of the claimed invention in the instant application relates to advanced computer processor architectures and systems.

BACKGROUND OF THE INVENTION

Most processor-based systems, including multi-processor based systems, rely on interrupts to handle high priority, system devices and I/O device requirements. In a system having multiple processing units, usually, each processing unit has its own operating system kernel. Each processor unit also includes within its logical or local store (LS) or private memory, software code called interrupt handlers that define tasks required to handle interrupts.

Generally, once an interrupt occurs, that interrupt channel is "blocked" until the interrupt handler has completed processing the interrupt. It is sometimes difficult to handle interrupts that can happen anywhere on the multi-processor system, especially given that each interrupt channel is blocked during handling of a particular interrupt.

Further, in multi-processor systems, a processor can only execute code present in its own private memory. Thus, when using traditional interrupt handling techniques, each processor must have all of the interrupt handlers necessary to handle any potential interrupt stored in its private memory. From a computer architecture standpoint, this amounts to a substantial waste of space.

Other alternative arrangements such as central handling of interrupts in one SPU can create processing bottlenecks. Still other alternatives such as copying interrupt handlers to processors as needed can create long system latency periods during copying.

These three issues: space, bottlenecks, and latency periods, demand a better solution for interrupt handling on multi-processor systems, and especially on widely distributed multi-processor systems such as the CELL architecture.

SUMMARY OF THE INVENTION

The present invention provides a system and method for handling interrupts. In accordance with one aspect of the present invention, a system includes a system memory and a plurality of processing units in communication with the system memory, each of the plurality of processing units having an interrupt channel. A micro interrupt handler is stored in the system memory, the micro interrupt handler being a software program that defines a subset of tasks associated with the predetermined interrupt. An interrupt handler is also stored in the system memory, the interrupt handler being a software program that defines all tasks associated with the predetermined interrupt except the subset of tasks defined by the micro interrupt handler.

When one of the plurality of processing units that is not executing any tasks, receives an interrupt on its interrupt channel, it performs a number of steps. It reads the micro interrupt handler associated with the predetermined interrupt from system memory and stores it in its local memory. It executes the tasks defined in the micro interrupt handler. It reads the interrupt handler associated with the predetermined interrupt from system memory and stored it in its local memory. It also executes the tasks defined in the interrupt handler. The micro interrupt handler will typically contain the code necessary to eliminate the cause of an interrupt through minimum operation. The interrupt handler contains code necessary to complete the operation of an interrupt.

In accordance with one aspect of the present invention, the micro interrupt handler is smaller than the interrupt handler.

When one of the processing units in a system that is already executing a task receives an interrupt, the processing units perform additional tasks. It writes at least a portion of the existing running task stored in its local memory to the system memory. Then it reads the micro interrupt handler associated with the predetermined interrupt from system memory and stores it in local memory. If the processing unit did not write the whole task to system memory, it writes the remaining portion of the existing task to the system memory. The processing on it executes the tasks defined in the micro interrupt handler. It also reads the interrupt handler associated with the interrupt from system memory and executes the tasks defined in the interrupt handler.

In another aspect of the invention an interrupt handling system is provided which includes a plurality of processing units, a memory and an interrupt channel. A micro interrupt handler is stored in said memory, providing a minimum amount of computer code necessary to un-block an interrupt channel, wherein said micro interrupt handler is copied to an assigned sub-processing unit from one of said plurality of sub-processing units in connection with receipt of an interrupt signal by said assigned sub-processing unit. The entire interrupt task is defined by an interrupt handler task remaining portion and the micro interrupt handler. In connection with a sub-processing unit task, which is to be carried out by the assigned sub-processing unit, the system is operable to save the sub-processing unit task in the memory by using a direct memory access channel, save the micro interrupt handler to an assigned sub-processing unit using a direct memory access channel, and execute the micro interrupt handler and interrupt handler task remaining portion.

In another aspect of the invention, an electronic device operable to be connected to a network consisting of a personal digital assistant, a digital television a wired computer, a wireless computer, and combinations thereof is provided by the invention. A plurality of processor elements having a plurality of processor units is also provided where at least one of said processor elements include the interrupt handling system of the invention as discussed above.

In another aspect of the invention a server computer is provided which includes the interrupt handling system of the invention as discussed above.

In yet another aspect of the invention a client computer is provided which includes the interrupt handling system of the invention as discussed above.

Figure 1:
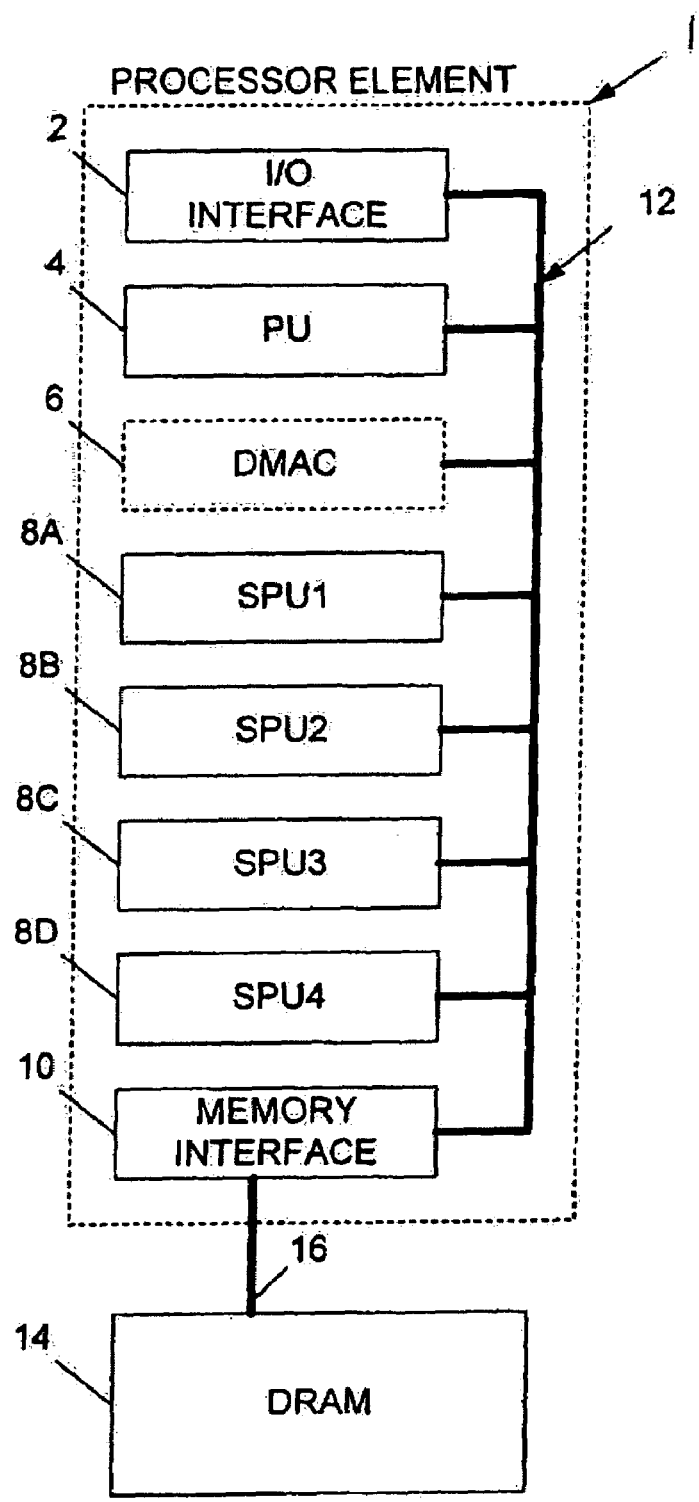
FIG. 1 is block diagram of a basic processing module or processor element.

Applicable reference numerals have been carried forward.

DETAILED DESCRIPTION

The invention relates to a method and system for handling interrupts. The present invention finds special applicability to multi-processing computer systems.

In accordance with a multi-processing computer system, all processors are constructed from a common computing module (or cell). Such a multi-processor computing system is described in U.S. Pat. No. 6,526,491, issued on Feb. 25, 2003, which is hereby incorporated by reference. The multi-processor computing system is also described in U.S. Patent Provisional Application No. 2002/0138637, published on Sep. 26, 2002, which is also hereby incorporated by reference.

The description of a multi-processor computing system herein and in the previously mentioned patent and patent application relates to a computer architecture known as the CELL architecture. This common computing module has a consistent structure and preferably employs the same instruction set architecture. The multi-processing computer system can be formed of one or more clients, servers, PCs, mobile computers, game machines, PDAs, set top boxes, appliances, digital televisions and other devices using computer processors.

The present invention will be described with respect to a particular multi-processor computer system, but has application to a wide variety of computer architectures.

In the CELL architecture, a plurality of the computer systems may also be members of a network if desired. The consistent modular structure enables efficient, high speed processing of applications and data by the multi-processing computer system, and if a network is employed, the rapid transmission of applications and data over the network. This structure also simplifies the building of members of the network of various sizes and processing power and the preparation of applications for processing by these members.

FIG. 1 illustrates a basic processing module in the CELL architecture. It is a processor element (PE). As shown in this figure, PE 1 comprises an I/O interface 2, a processing unit (PU) 4, a direct memory access controller (DMAC) 6, and a plurality of sub-processing units 8, namely, sub-processing unit 8A, sub-processing unit 8B, sub-processing unit 8C, and sub-processing unit 8D. A local (or internal) PE bus 12 transmits data and applications among the PU 4, sub-processing units 8, DMAC 6, and a memory interface 10. Local PE bus 12 can have, e.g., a conventional architecture or it can be implemented as a packet switch network. Implementation as a packet switch network, while requiring more hardware, increases available bandwidth.

PE 1 can be constructed using various methods for implementing digital logic. PE 1 preferably is constructed, as a single integrated circuit employing a complementary metal oxide semiconductor (CMOS) on a silicon substrate. Alternative materials for substrates include gallium arsenide, gallium aluminum arsenide and other so-called III-B compounds employing a wide variety of dopants. PE 1 can also be implemented using superconducting material, e.g., rapid single-flux-quantum (RSFQ) logic.

PE 1 is closely associated with dynamic random access memory (DRAM) 14 through high bandwidth memory connection 16. DRAM 14 functions as the main memory for PE 1. Although DRAM 14 preferably is a dynamic random access memory, DRAM 14 can be implemented using other means, e.g., static random access memory (SRAM), magnetic random access memory (MRAM), optical memory, holographic memory, etc. DMAC 6 and memory interface 10 facilitate the transfer of data between DRAM 14, sub-processing units 8 and PU 4 of PE 1. It is noted that DMAC 6 and/or memory interface 10 may be integrally or separately disposed with respect to sub-processing units 8 and PU 4. Indeed, instead of a separate configuration as shown, DMAC 6 and/or the memory interface 10 may function integrally with PU 8 and one or more (preferably all) sub-processing units 8. Thus, DMAC 6 is shown in dashed lines.

PU 4 can be, e.g., a standard processor capable of stand-alone processing of data and applications. In operation, PU 4 schedules and orchestrates the processing of data and applications by the sub-processing units. The sub-processing units preferably are single instruction, multiple data (SIMD) processors. Under the control of PU 4, sub-processing units 8 perform the processing of data and applications in a parallel and independent manner. DMAC 6 controls access, by PU 4 and sub-processing units 8, to the data and applications stored in DRAM 14. It is noted that PU 4 may be implemented by one of the sub-processing units 8, taking on the role of a main processing unit that schedules and orchestrates the processing of data and applications by sub-processing units 8.

In accordance with this modular structure, the number of processor elements employed by a particular computer system is based upon the processing power required by that system. For example, a server may employ four processor elements, a workstation may employ two processor elements and a PDA may employ a single processor element. The number of sub-processing units of a processor element assigned to processing a particular software cell depends upon the complexity and magnitude of the programs and data within the cell.

Figure 2:
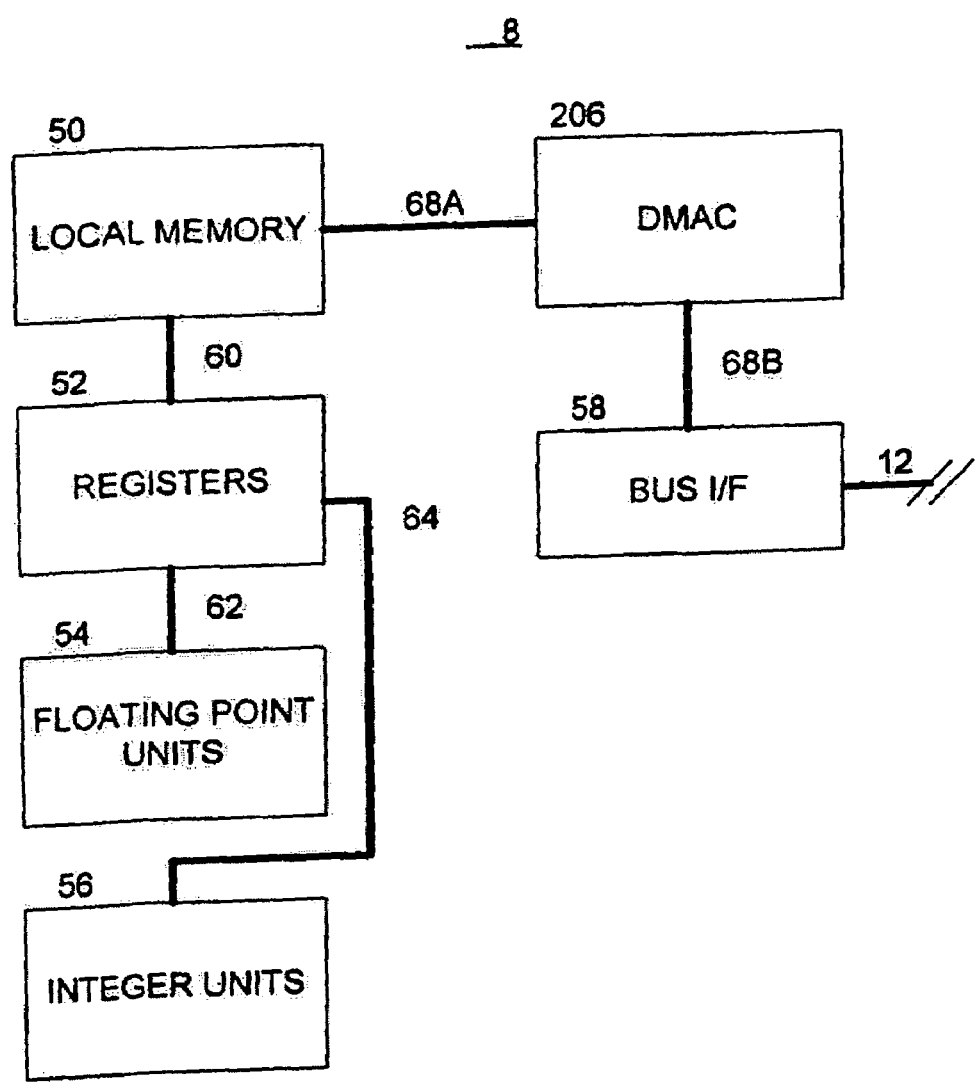
FIG. 2 illustrates the preferred structure and function of a sub-processing unit.

FIG. 2 illustrates a preferred structure and function of a sub-processing unit 8. Sub-processing unit 8 includes local memory 50, registers 52, one or more floating point units 54 and one or more integer units 56. Again, however, depending upon the processing power required a greater or lesser number of floating points units 54 and integer units 56 may be employed. In a preferred embodiment, the local memory 50 contains 256 kilobytes of storage, and the capacity of registers 52 is 128×128 bits. The floating point units 54 preferably operate at a speed of 32 billion floating point operations per second (32 GFLOPS), and the integer units 56 preferably operate at a speed of 32 billion operations per second (32 GOPS).

The local memory 50 may or may not be a cache memory. The local memory 50 is preferably constructed as a static random access memory (SRAM). A PU 4 may require cache coherency support for direct memory accesses initiated by the PU 4. Cache coherency support is not required, however, for direct memory accesses initiated by the sub-processing units 8 or for accesses from and to external devices.

The sub-processing unit 8 further includes a bus interface (I/F) 58 for transmitting applications and data to and from the sub-processing unit 8. In a preferred embodiment, the bus I/F 58 is coupled to a DMAC 6, which is shown in dashed line to indicate that it may be integrally disposed within the sub-processing unit 8 as shown or may be externally disposed (as shown in FIG. 2). A pair of busses 68, 68B interconnects the DMAC 6 between the bus I/F 58 and the local memory 50. The busses 68A, 68B are preferably 56 bits wide.

The sub-processing unit 8 further includes internal busses 60, 62 and 64. In a preferred embodiment, the bus 60 has a width of 56 bits and provides communications between the local memory 50 and the registers 52. The busses 62 and 64 provide communications between, respectively, the registers 52 and the floating point units 54, and the registers 52 and the integer units 56. In a preferred embodiment, the width of the busses 64 and 62 from the registers 52 to the floating point or the integer units is 384 bits, and the width of the busses 64 and 62 from the floating point or the integer units 54, 56 to the registers 52 is 128 bits. The larger width of these busses from the registers 52 to the floating point or the integer units 54, 56 than from these units to the registers 52 accommodates the larger data flow from the registers 52 during processing. A maximum of three words are needed for each calculation. The result of each calculation, however, normally is only one word.

Figure 3:
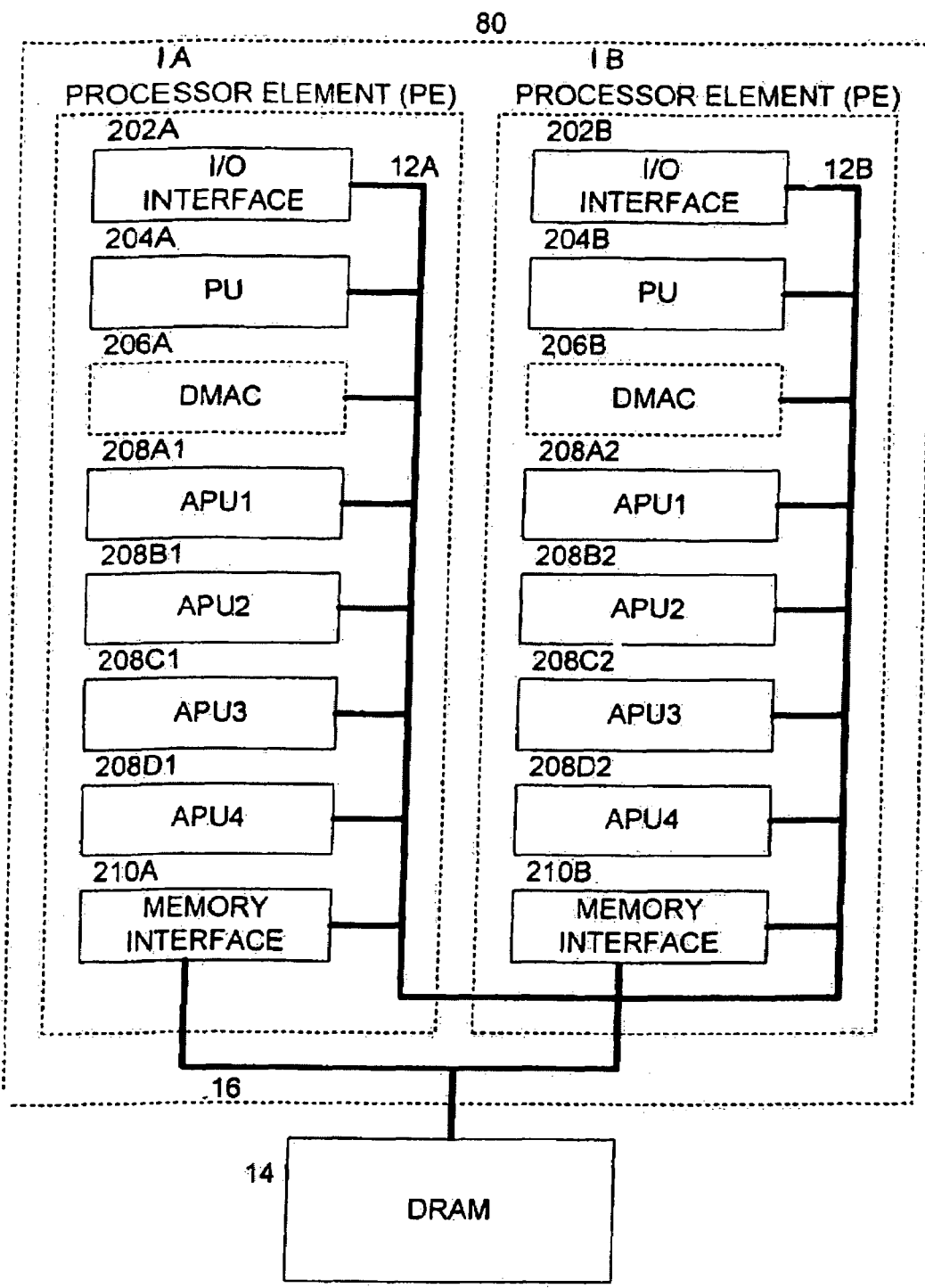
FIG. 3 illustrates processor elements which may be packaged or joined together, within one or more chip packages, to form a set of multi-processor units.

FIGS. 3 through 6 illustrate multi-processing systems wherein a number of processor elements, as shown in FIG. 1, may be joined or packaged together to provide enhanced processing power. For example, as shown in FIG. 3, two or more processor elements 1A, 1B may be packaged or joined together, e.g., within one or more chip packages, to form a set of multi-processor units. This configuration may be referred to as a broadband engine (BE). As shown in FIG. 3, the broadband engine 80 contains the two processor elements 1A, 1B, which are interconnected for data communication over a bus 12. An additional data bus 16 is preferably provided to permit communication between the processor elements 1A, 1B and the shared DRAM 14. One or more input/output (I/O) interfaces 2A and 2B and an external bus (not shown) provide communications between the broadband engine 80 and any external elements. Each of the processor elements 1A and 1B of the broadband engine 80 perform processing of data and applications in a parallel and independent manner analogous to the parallel and independent processing of applications and data performed by the sub-processing elements 8 discussed hereinabove with respect to FIG. 1.

Figure 4:
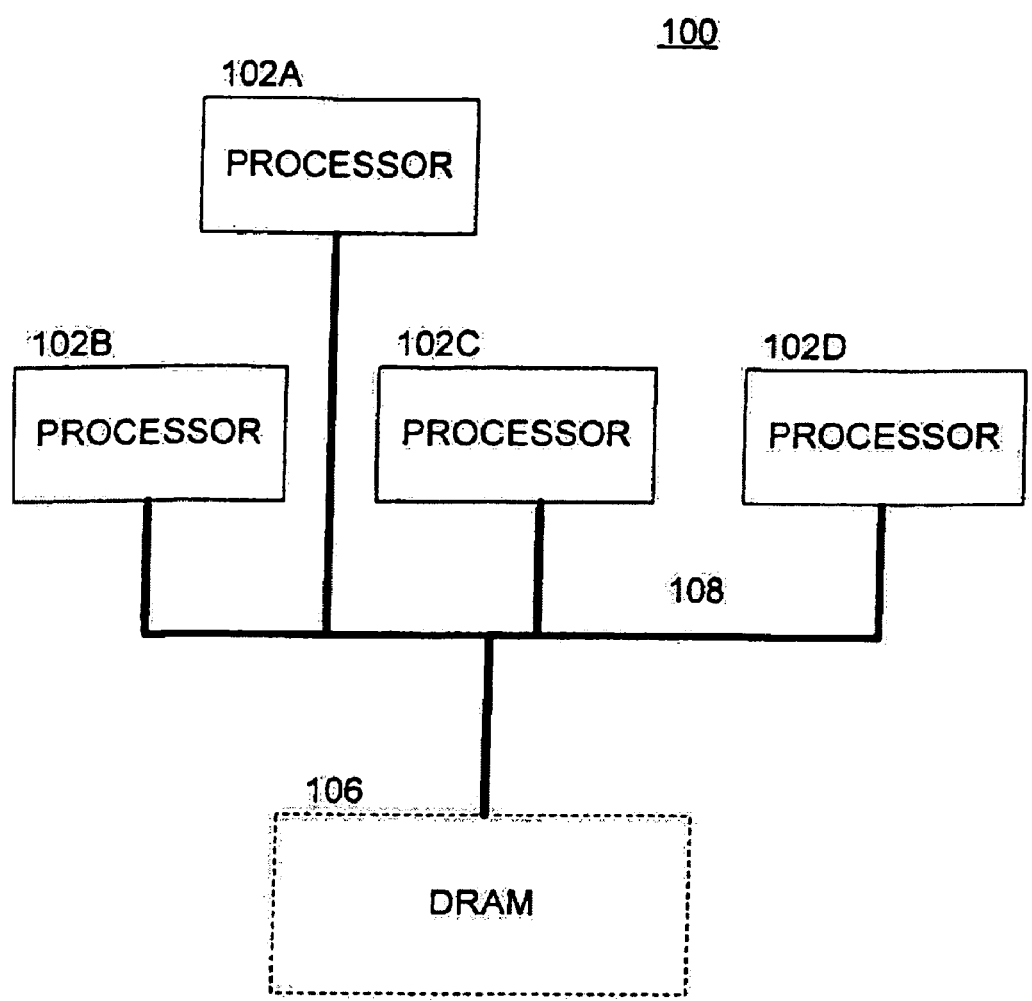
FIG. 4 is a block diagram of one preferred embodiment of a multi multi-processing system.

With reference to FIG. 4, a block diagram of one preferred embodiment of a multi multi-processing system is shown in which multi-processing system 100 includes a plurality of processors 102 (any number may be used) coupled to memory, such as DRAM 106, shared over bus 108. It is noted that DRAM memory 106 is not required (and thus is shown in dashed line). Indeed, one or more processing units 102 may employ its own memory (not shown) and have no need for shared memory 106.

One of the processors 102 is preferably a main processing unit, for example, processing unit 102A. The other processing units 102 are preferably sub-processing units (SPUs), such as processing unit 102B, 102C, 102D, etc. The processing units 102 may be implemented using any of the known computer architectures. All of the processing units 102 need not be implemented using the same architecture; indeed they may be of heterogeneous or homogenous configurations. In operation, the main processing unit 102A preferably schedules and orchestrates the processing of data and applications by the sub-processing units 102B-D such that the sub-processing units 102B-D perform the processing of these data and applications in a parallel and independent manner.

It is noted that the main processing unit 102A may be disposed locally with respect to the sub-processing units 102B-D, such as in the same chip, in the same package, on the same circuit board, in the same product, etc. Alternatively, the main processing unit 102A may be remotely located from the sub-processing units 102B-D, such as in different products, which may be coupled over a bus, a communications network (such as the Internet) or the like. Similarly, the sub-processing units 102B-D may be locally or remotely located from one another.

Figure 9:
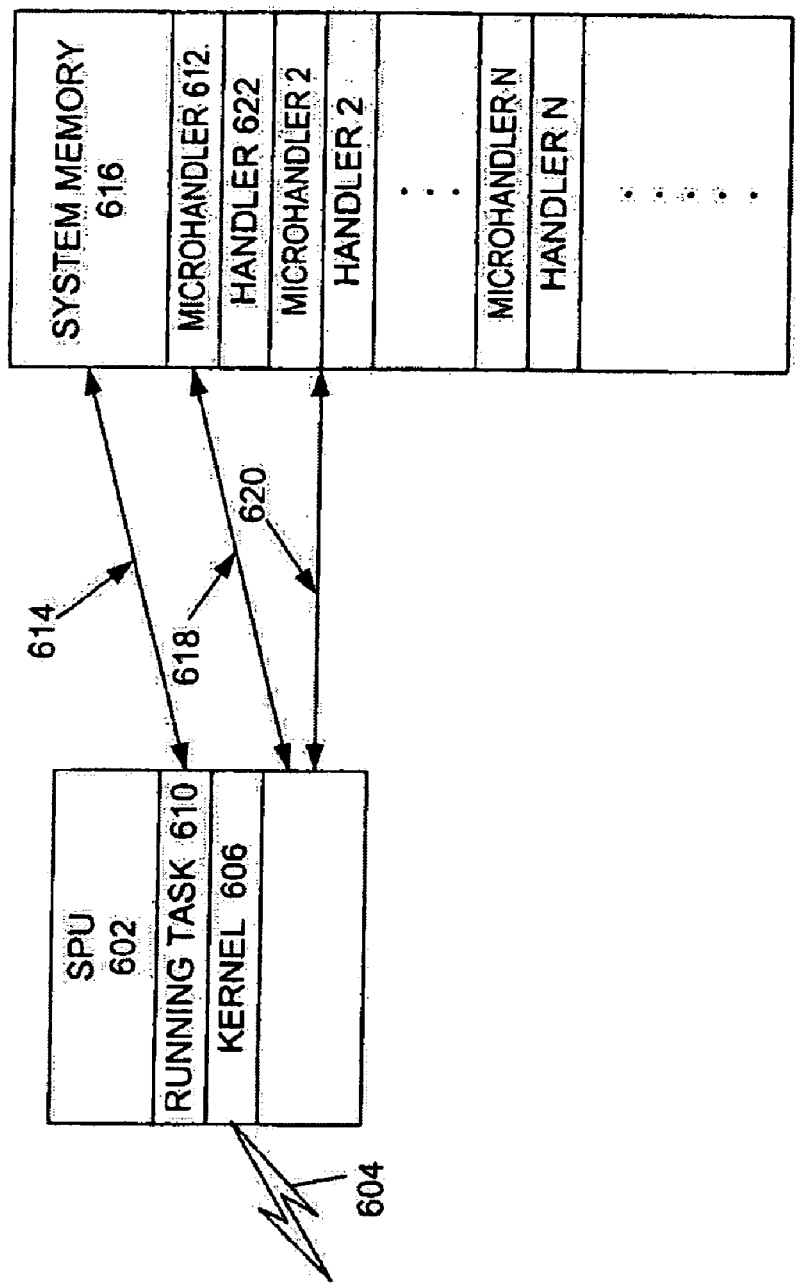
FIG. 9 illustrates one aspect, depicted using block diagrams, of the present invention.

The participating sub-processing units may include one or more further sub-processing units of one or more further multi-processing systems, such as system 100 (FIG. 4), system 1 (FIG. 1), and/or system 80 (FIG. 3). As will be apparent to one skilled in the art from the description hereinabove, the participating sub-processing units, therefore, may include one or more respective groups of sub-processing units, where each group is associated with a respective main processing unit. As to the system 100 of FIG. 4, the main processing unit is processor 102A and the respective group of sub-processing units includes processors 102B-D, which are associated with the main processing unit 102A. Similarly, if system 1 of FIG. 1 is employed, then the participating sub-processing units, may include further sub-processing units 8A-D that are associated with a further main processing unit 4. Still further, if the system 80 (broadband engine) of FIG. 9 is employed, then the participating sub-processing units may include an additional two (or more) groups of sub-processing units 208A1-D1, which are associated with the main processing unit 204A, and sub-processing units 208A2-D2, which are associated with main processing unit 204B.

In this regard, the participating groups of sub-processing units (and the respective associated main processing units) may be part of a set of multi-processing units, such as is illustrated in FIG. 3 in which the respective groups of sub-processing units share a common data bus 12A or 12B. Alternatively, or in addition, one or more of the respective groups of participating sub-processing units may be a stand alone multi-processing unit, such as is illustrated in FIG. 1 or 2, where no such common data bus exists between respective groups of sub-processing units. Further, one or more of the respective groups of participating sub-processing units may be at least part of a distributed multi-processing unit, where at least some of the sub-processing units are remotely located with respect to one another.

Figure 5:
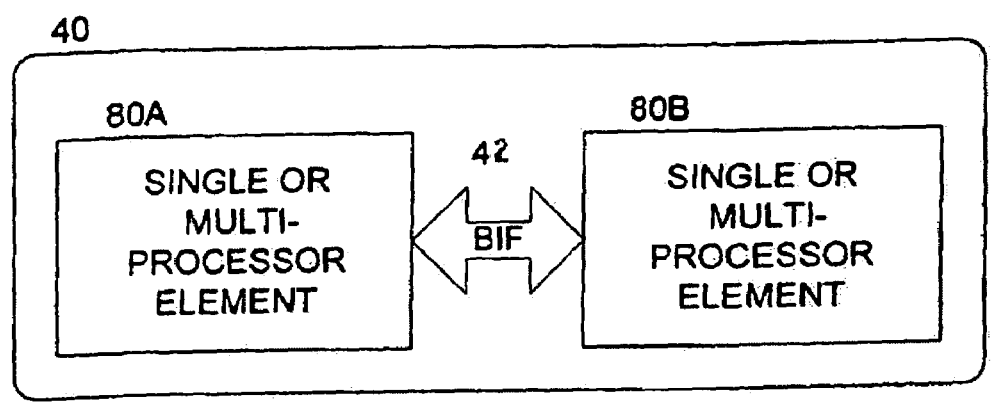
FIG. 5 illustrates multi-processing units as part of a set and as part of a stand alone configuration.

With reference to FIG. 5, the respective multi-processing units, whether part of a set or part of a stand alone configuration, may be disposed on common or different circuit boards, in common or different products, and/or at common or different locations. As shown in FIG. 5, a pair of broadband engines 80A and 80B (which happen to include respective sets of multi-processor elements 1 (shown in FIG. 1)) are disposed on common circuit board 40. Although broadband engines 80A and 80B are illustrated in this example, it is noted that stand-alone multi-processing units (such as employing a single processor element 1 of FIG. 1) are also contemplated. Respective multi-processing units 80A and 80B are interconnected by way of a broadband interface (BIF) 42.

Figure 6:
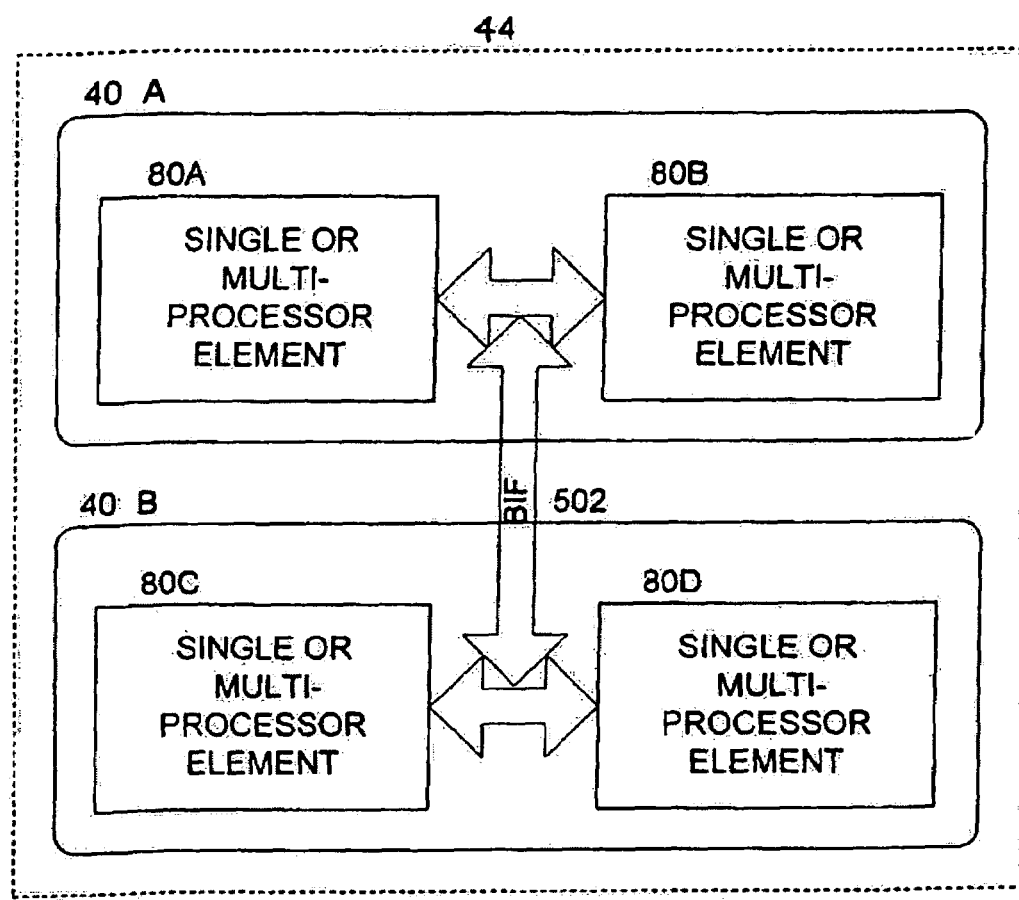
FIG. 6 illustrates a plurality of multi-processing units which may be disposed on different circuit boards which are disposed in a single product.

With reference to FIG. 6, a plurality of multi-processing units 80A-D may be disposed on different circuit boards 40, while circuit boards 40 are disposed in a single product 44. More particularly, multi-processing units 80A and 80B are disposed on a common circuit board 40A, while the multi-processing units 80C and 80D are disposed on a different circuit board 40B. Both circuit boards 40A and 40B, however, are disposed within a single product 44. Thus, data communications between the respective multi-processing units 80A-D may be carried out by way of a broadband interface (BIF) 502 that may include an intra-circuit board portion and an inter-circuit board portion.

Figure 7:
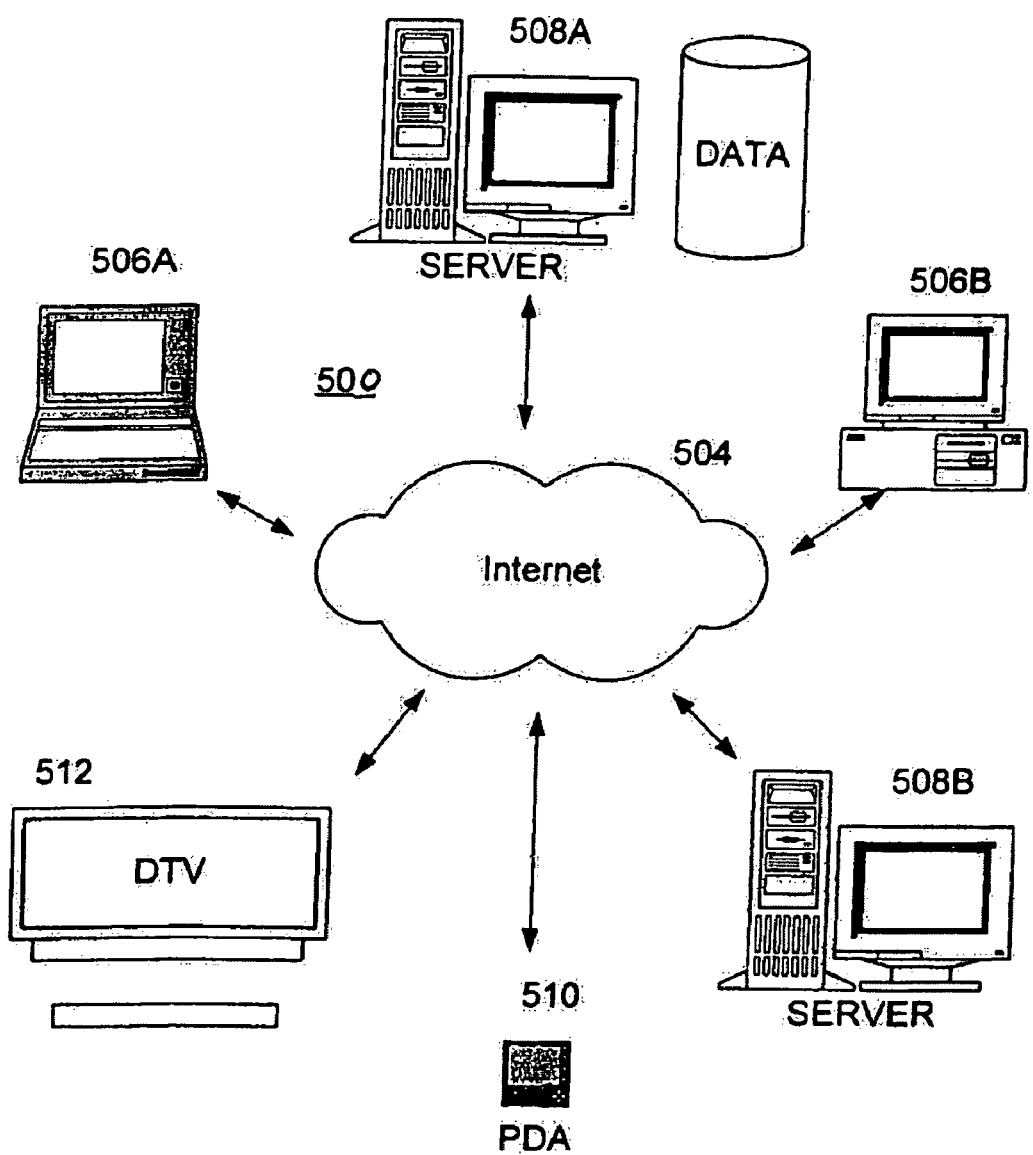
FIG. 7. illustrates stand-alone multi-processing elements or broadband engines (sets of multi-processing elements) which may be distributed among a plurality of products to form a multi-processing system.

As discussed above, the participating sub-processing units (e.g., 102B-D and/or 8A-D) of the respective multi-processing units may be disposed in different products. Data communications among such products (and sub-processing units) must, therefore, employ more than a bus interface and/or broadband interface within a single product. In this regard, reference is now made to FIG. 7. Here, stand-alone multi-processing elements 8 or BEs 80 (sets of multi-processing elements) may be distributed among a plurality of products to form multi-processing system 500. The elements or members (implemented as computer and/or computing devices) of system 500 are preferably in communication over network 504. Network 504 may be a local area network (LAN), a global network, such as the Internet, or any other computer network.

The members that are connected to network 504 include, e.g., client computers 506, server computers 508, personal digital assistants (PDAs) 510, digital television (DTV) 512, and other wired or wireless computers and computing devices. For example, client 506A may be a laptop computer constructed from one or more of PEs 1 or other suitable multi-processing systems. Client 506B may be a desk-top computer (or set top box) constructed from one or more of PEs 1 or other suitable multi-processing systems. Further, server 506A may be an administrative entity (employing a database capability), which is also preferably constructed from one or more PEs 1.

Figure 8:
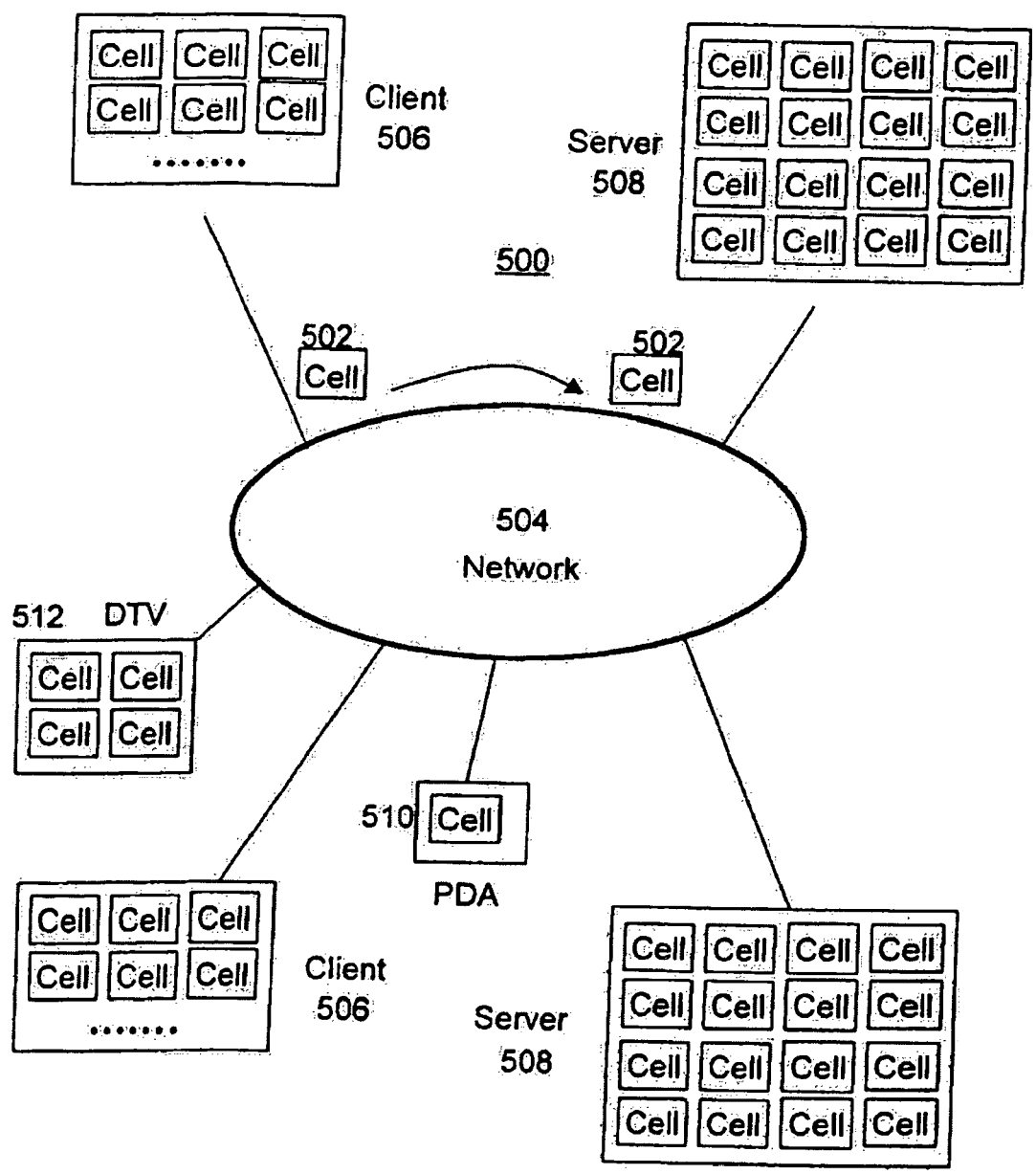
FIG. 8 is a block diagram of an overall computer network in accordance with one or more aspects of the present invention.

The processing capabilities of multi-processing system 500 may rely on a plurality of processor elements 1 disposed locally (e.g., one product) or disposed remotely (e.g., in multiple products). In this regard, reference is made to FIG. 8, which is a block diagram of an overall computer network in accordance with one or more aspects of the present invention. Again, the PEs 1 and/or broadband engines 80 (made of multiple PEs) may be used to implement an overall distributed architecture for computer system 500.

Since servers 508 of system 500 perform more processing of data and applications than clients 506, servers 508 contain more computing modules (e.g., PEs 1) than clients 506. PDAs 510, on the other hand, in this example perform the least amount of processing. Thus, PDAs 510 contain the smallest number of PEs 1, such as single PE 1. DTVs 512 perform a level of processing that is substantially between that of clients 506 and the servers 508. Thus, DTVs 512 contain a number of processor elements between that of clients 506 and servers 508.

The present invention provides systems and methods for handling interrupts via a micro interrupt handler. The system and method of the present invention, when used in connection with multi-processor systems, such as the foregoing multi-processor systems discussed in connection with FIGS. 1 through 6, provides efficient handling of interrupts.

FIG. 9 illustrates one aspect of the present invention. A processor, such as the SPU 602, can receive an interrupt signal 604. When the interrupt signal 604 is received by the SPU 602, the SPU 602 checks to see if the SPU is running a task. If a task is being run, the SPU 602 must then determine what to do with the task. In FIG. 9, for example, a running task 610 is resident in the local memory of the SPU 602, and is being executed by the SPU 602. In the case of FIG. 9, a first part of the running task 610 is stored to system memory 616 via direct memory access channel 614. A micro interrupt handler 612 is spawned to handle the interrupt signal and a second part of the running task is stored to memory 616 via direct memory access channel 614. Micro interrupt handler 612 is copied to SPU 602 and executed by SPU 602. Next, the previous running task 610 is read through direct memory access channel 614 and restored to SPU 602. Long lag times for interrupt processing, and inefficiencies in processor task queues are avoided by the invention. The first part of running task 610 can include the processor status word (PSW) and the program counter PC. The micro interrupt handler is preferably a program used to handle an interrupt and contains a minimum amount of code necessary to provide the interrupt channel to an assigned SPU. The second part of the running task is written via direct memory access.

The present invention allows for a specialized interrupt handler, i.e., the micro interrupt handler, that, upon receipt of an interrupt, copies through a DMA channel, the minimal amount of programming code necessary to free that interrupt channel and allow the interrupt to be handled by an assigned SPU. The remainder of the interrupt handler is copied via either DMA channel or normal inter-processor communication channels.

With reference again to FIG. 9 in a preferred embodiment of the invention, interrupt servicing according to the invention occurs as follows: (1) a SPU 602 receives an interrupt signal 604; (2) a first part of current running task 610 running on the SPU 602 is saved to system memory 616 via a DMA channel 614; (3) micro interrupt handler 612 for interrupt 604 is read from system memory 616 via the DMA channel 614; (4) the rest of the previously running task is written via the DMA channel 614 to the system memory 616; (5) micro interrupt handler 612 is executed by the SPU 602, and (6) the remaining portion of the interrupt handler task 622 is read by the SPU 602 from system memory and then executed by the SPU 602. Thereafter, task 610 is read from memory 616 and processing within SPU 602, which was occurring prior to the interrupt, continues.

The task to be executed during the interrupt is divided between the micro interrupt handler and the interrupt handler. Each of the micro interrupt handler and interrupt handler contain a certain amount of lines of software code that defines the task to be performed during the interrupt. The interrupt handler contains the rest of the code defining the task to be performed by the interrupt, that is, the interrupt handler contains all of the code associated with the interrupt that is not contained in the micro interrupt handler.

Figure 10:
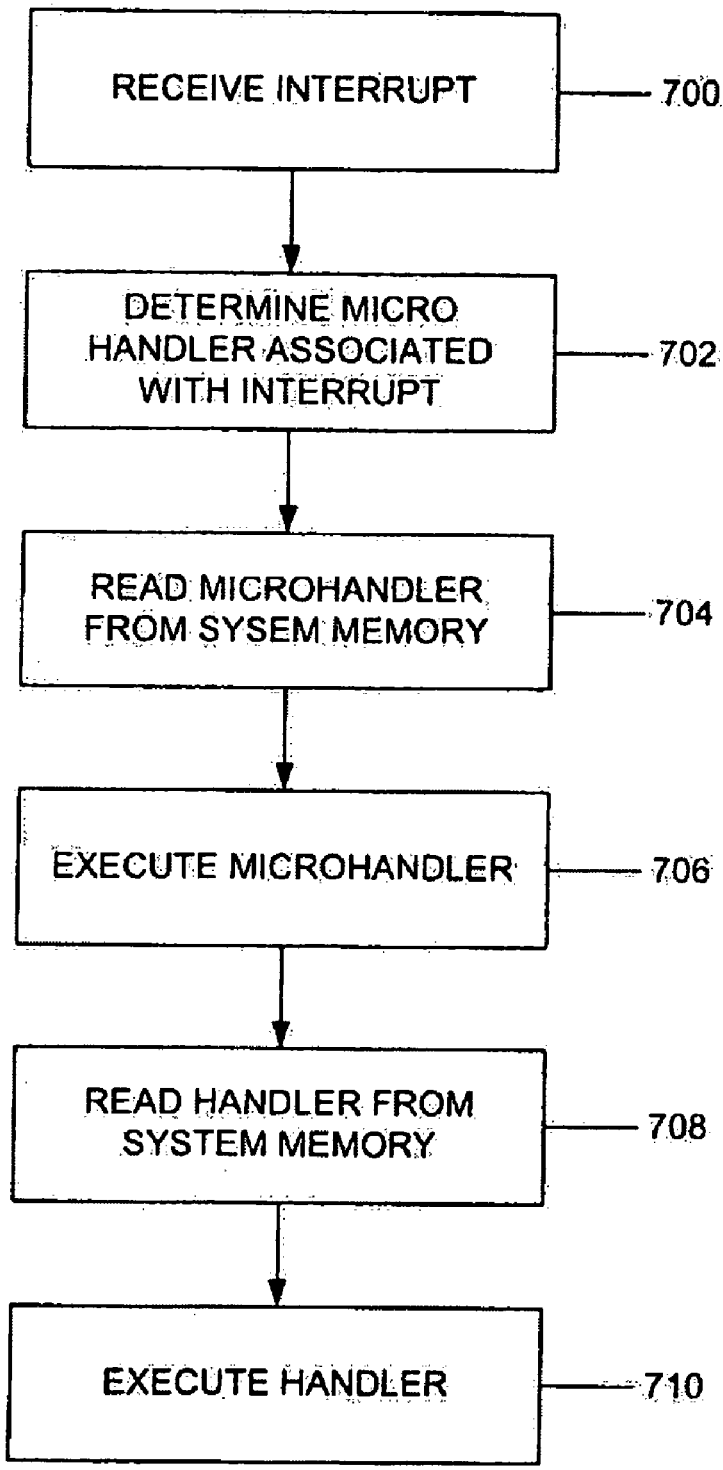
FIGS. 10 to 12 illustrate the interrupt processing steps in accordance with one aspect of the present invention.

FIG. 10 illustrates a flow diagram of steps performed by a processing unit, such as a sub-processing unit, when handling an interrupt in accordance with one aspect of the present invention. In particular, the steps illustrated in FIG. 10 are those taken by a processing unit that is idle, such that the processing unit is not executing a task at the time the interrupt is received.

In step 700, a processing unit receives an interrupt. A processing unit that receives the interrupt can be any of the previously disclosed processing units. In accordance one aspect of present invention, when using a system having the CELL architecture disclosed in FIGS. 1 to 8, the subprocessing units 8 receive the interrupt.

In step 702, the processing unit that receives the interrupt determines which micro interrupt handler is associated with the interrupt. This can be accomplished by means of a look-up table that associates micro interrupt handlers with the various interrupts that can occur in the system. By referencing the table with the received interrupt as a reference, the appropriate micro interrupt handler is identified.

In step 704, the processing unit that receives the interrupt accesses system memory. The system memory is accessible by all of the processing units and is generally not associated with any particular processing unit. The system memory stores all micro interrupt handlers for all interrupts that can occur in a system. The processing unit reads the micro interrupt handler associated with the received interrupt from system memory, based on the information determined in step 702. The micro interrupt handler is stored in the local memory of the processor receiving the interrupt. Of course, the functionality of determining which micro interrupt handler should be read by the processing unit receiving the interrupt could also be incorporated outside of the processing unit, for example, in the system memory. In this case, the processor would simply advise the system memory, or other component, which interrupt was received. The system memory would then deliver the appropriate micro interrupt handler to the processing unit receiving the interrupt upon request by the processing unit.

In step 706, the processing unit executes the micro interrupt handler. As previously described, the micro interrupt handler preferably defines a small portion of the tasks-necessary to be performed during the interrupt. Thus, in accordance with a preferred embodiment of the present invention, the micro interrupt handler is smaller than the interrupt handler for an interrupt.

In step 708, the processing unit that received the interrupt accesses the system memory to read the remaining interrupt handler associated with the received interrupt from system memory. As described before, the interrupt handler associated with the received interrupt can be determined at the processing unit, for example, by the use of a look-up table that associates interrupt handlers with interrupts. This may be the same look up table used to determine the appropriate micro interrupt handler, and may also be accomplished at the same time as determining the correct micro interrupt handler to access. Alternatively, the appropriate interrupt handler to read from system memory can be determined outside of the processing unit, for example, at the system memory by means of a similar look-up table. The interrupt handler, when read, is stored in the local memory of the processor that received the interrupt. In step 710, the processing unit executes the interrupt handler.

In FIG. 10, the step of reading the interrupt handler from system memory is illustrated as occurring after the step of executing the micro interrupt handler. It is possible that the processing unit may read the interrupt handler before executing the micro interrupt handler. In accordance with a preferred embodiment of the present invention, however, the step of reading the interrupt handler is executed after the step of executing the micro interrupt handler. This allows the code representing the micro interrupt handler to be deleted from the local memory of the processing unit as soon as possible so as to conserve local memory space in the processor receiving the interrupt.

Figure 11:
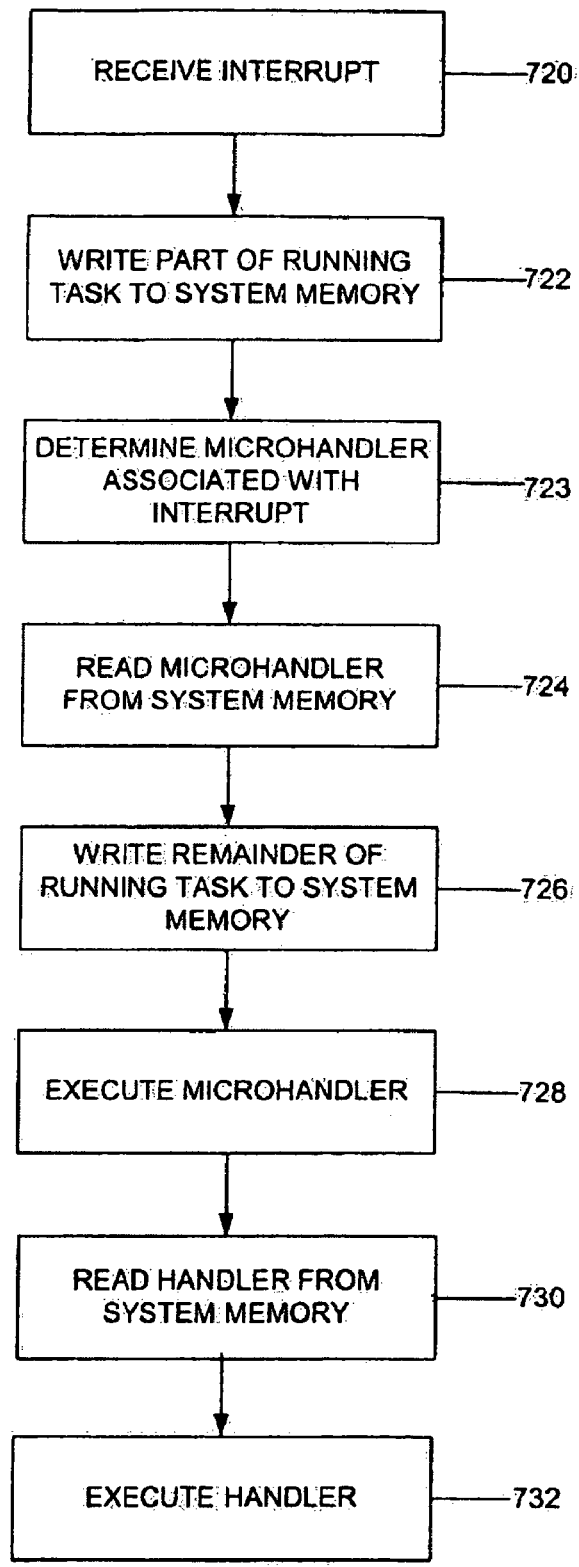
Figure 12:
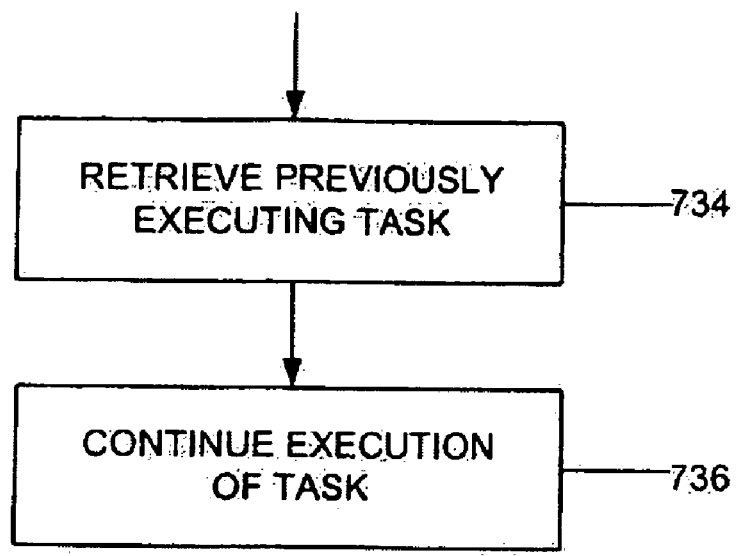

FIG. 10 illustrates the steps performed by a processing unit that receives an interrupt signal where the processing unit is idle. When the processing unit receiving an interrupt is not idle, that is, it is executing a task, additional steps must be taken. FIGS. 11-12 illustrate the steps taken by an active processing unit that receives an interrupt in accordance with the preferred embodiment of the present invention.

In step 720, the processing unit receives an interrupt. At the time, the processing unit has a task stored in local memory that is being executed by the processing unit. During interrupt processing, the processing unit must take care not to lose information generated while performing the task. Thus, in step 722, the processing unit receiving the interrupt writes at least a part of the running task from its local memory to system memory.

In step 723, the processing unit receiving the interrupt determines which micro interrupt handler is associated with the received interrupt. The step is similar to the one previously described with respect to an idle processing unit. This step can be implemented in a fashion similar to those previously described, for example, with a look-up table.

In step 724, the processing unit receiving the interrupt reads the appropriate micro interrupt handler from the system memory, based on the information determined in step 723. In step 726, the processing unit receiving the interrupt writes the remainder of the running task from the processing unit's local memory to system memory.

In step 728, the processing unit that received the interrupt executes the associated micro interrupt handler. In step 730, the processing unit receiving the interrupt reads the interrupt handler associated with the received interrupt from system memory, and then in step 732, the processing unit receiving the interrupt executes the interrupt handler, thereby executing the assigned tasks generated by the interrupt.

In step 734, shown in FIG. 12, the processing unit that received the interrupt has completed processing interrupt, and now preferably continues to process the previously running task. The processing unit therefore retrieves the task that was previously running from system memory and stores the task in the local memory of the processing unit. In step 736, the processing unit resumes executing the task.

In the steps of FIGS. 11 and 12, it is preferred to write a portion of the running task to system memory before retrieving the micro handler. Performing the step before retrieving the micro handler from system memory allows conservation of memory space and the processing units local memory, and is therefore a preferred embodiment of the present invention. It is not necessary, however, to write a portion of the task back to system memory before retrieving the micro handler. For example, in cases where there is an abundance of local memory at the processing unit, it is not necessary to write a portion of the task back to system memory before reading the micro handler from system memory. In fact, it may not be necessary to write the part of the running task to system memory at all if there is enough local memory at the processing unit.

Figure 13:
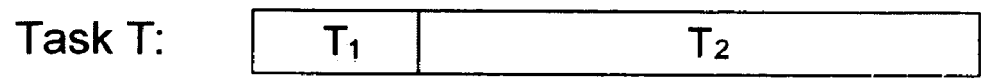
FIG. 13 illustrates how a task and an interrupt handler are divided according to a preferred embodiment of the present invention.
Figure 13:

FIG. 13 illustrates how a task T and an interrupt handler A are divided according to a preferred embodiment of the present invention. The task T is a task which is being executed in a local memory by a processing unit when an interrupt is received. The interrupt handler A is stored in the system memory.

The processing unit, which is executing a task when the interrupt is received, divides the task T being executed into a first task $T_1$ and a second task $T_2$ and transmits the same to the system memory. In this process, the processing unit divides the task T such that the data size of the first task $T_1$ is equal to or slightly larger than the data size of a micro interrupt handler $A_1$ described later. By dividing the task T in this way, it is possible to store the micro interrupt handler $A_1$ in an area of the local memory that had been occupied by the first task $T_1$, as a result of the first task $T_1$ being stored in the system memory. Since the data size of the first task $T_1$ is relatively small, it is possible to store the first task $T_1$ in the system memory in a relatively short period of time.

The processing unit also divides the interrupt handler A into a micro interrupt handler $A_1$ and an interrupt handler $A_2$ and reads them into the local memory. In this process, the interrupt handling system divides the interrupt handler A such that the micro interrupt handler $A_1$ is smaller in data size and requires less heavy processing load than the interrupt handler $A_2$. The micro interrupt handler $A_1$ comprises subroutines that provide minimum services Normally, the size of the micro interrupt handler is on the order of 1-2 KB.

Figure 14:
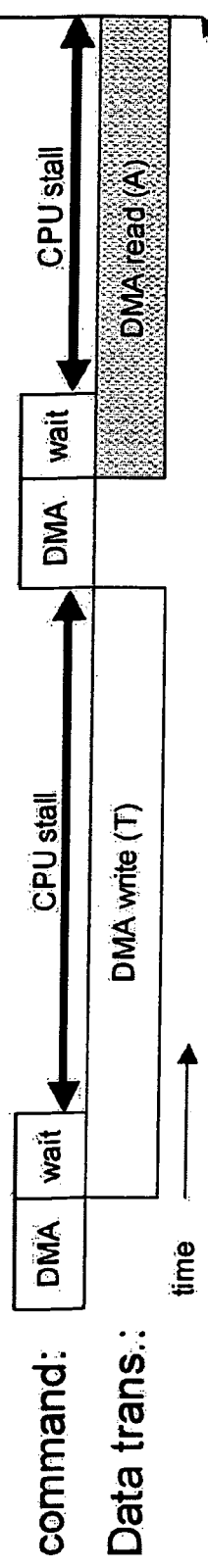
FIG. 14 is a chart comparing interrupt handling methods according to the related art with an interrupt handling method according to the preferred embodiment of the present invention with respect to command execution timing and data transfer timing.
Figure 14:
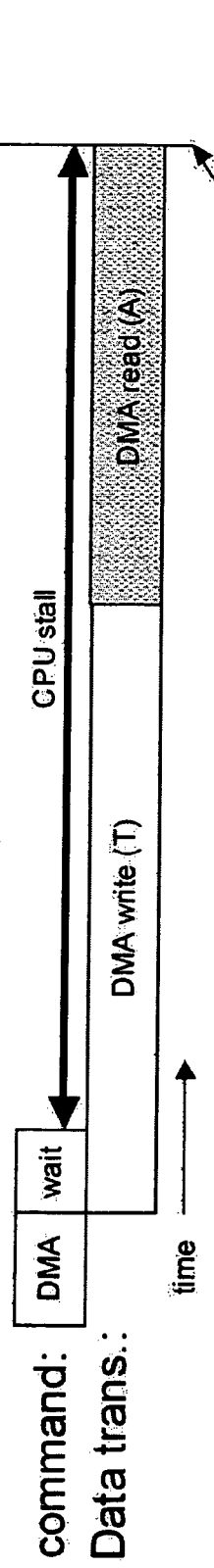
Figure 14:
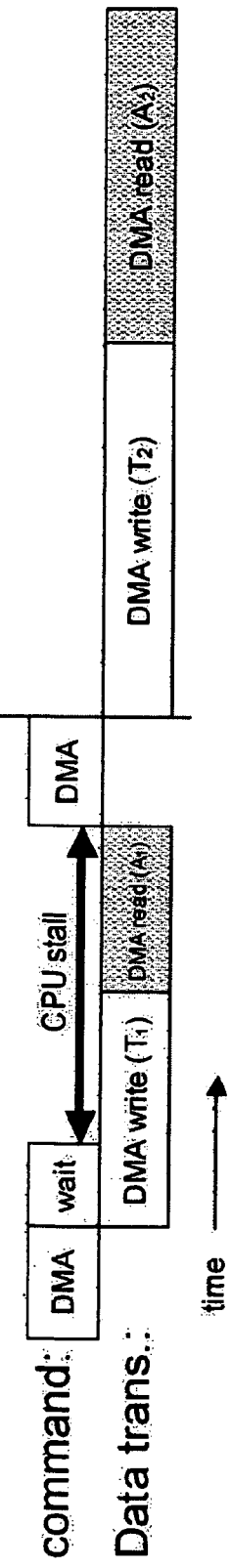

FIG. 14 is a chart comparing interrupt handling methods according to the related art with an interrupt handling method according to the preferred embodiment of the present invention with respect to command execution timing and data transfer timing.

Normally, the size of a task being executed in the local memory by the processing unit is relatively large, and the handler stored in the system memory is also of a relatively large size. Interrupt handling involves a process of writing the task in the local memory to the system memory and a process of reading the interrupt handler in the system memory into the local memory.

The processing unit according to this embodiment transfers data at a rate of 1 byte data per 1 clock cycle. The processing unit operates at a clock frequency of 3.2 GHz. Therefore, the processing unit requires 30 μsec to transfer 100 KB data and requires 0.3 μsec to transfer 1 KB data. The size of the task T is 100 KB, the total size of the interrupt handler A is 20 KB and the size of the micro interrupt handler $A_1$ is 1 KB.

In the first related-art interrupt handling method, the processing unit executes a DMA command and then a wait command. In conjunction with this, the processing unit writes the entirety of the task T being executed to the system memory. When the writing of the task T is completed, the processing unit executes the DMA command. About 10 clock cycles are required to execute the DMA command. When the execution of the DMA command is completed, the processing unit executes a wait command and starts reading the interrupt handler A from the system memory. When the reading of the interrupt handler is completed, the processing unit starts executing the interrupt handler. In this way, the processing unit can start executing the interrupt handler when the task T has been written, the DMA command has been executed and the interrupt handler has been read. By executing a wait command, the DMA command is prevented from being executed while the current task is being written in the system memory and while the interrupt handler is being read into the local memory.

In the second interrupt handling method according to the related art, the processing unit executes a DMA command by using a fence command. In this way, the processing unit can start reading the interrupt handler immediately after the task T is written, without executing both the DMA command and the wait command. By executing a fence command, the processing unit can start executing the interrupt handler $A_1$ immediately after the writing of the task T and the reading of the interrupt handler are completed. Accordingly, the second interrupt handling method according to the related art can start executing the interrupt handler earlier than the first interrupt handling method according to the related art, by a period of time defined by the execution of the DMA command. In the second related art method, a period of 30 μsec is required to write the task T, a period of 7 μsec is required to read the interrupt handler A so that a total period of 37 μsec is required between the reception of an interrupt signal and the start of execution of the interrupt handler.

In contrast, according to the interrupt handling method of this embodiment, the processing unit executes the DMA command by using a fence command and starts reading the micro interrupt handler $A_1$ immediately after the writing of the first task $T_1$ completed. When the micro interrupt handler $A_1$ has been read, the processing unit executes the DMA command by using a fence command and starts reading the interrupt handler $A_2$ immediately after the second task $T_2$ is written.

Depending on the type of interrupt, the micro interrupt handler $A_1$ alone may be sufficient to handle an interrupt request. In this case, it is not necessary to write the second task $T_2$ and read the interrupt handler $A_2$. Therefore, time required to execute the interrupt handler is significantly reduced. In this method, a period of 0.3 μsec is required to write the first task $T_1$, a period of 0.3 μsec is required to read the micro interrupt handler $A_1$ so that a total period of 0.6 μsec is required between the reception of an interrupt signal and the start of execution of the interrupt handler.

If, for example, a context switch is requested, the entirety of the interrupt handler should be executed. In this case, it is necessary to read, the interrupt handler $A_2$. However, execution of the micro interrupt handler $A_1$ and the writing of the second task to the system memory may be executed in parallel so that efficient interrupt handling is achieved.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A system for handling a predetermined interrupt, comprising:
   a system memory;
   a processing unit in communication with the system memory, the processing unit having an interrupt channel;
   a micro interrupt handler stored in the system memory, the micro interrupt handler defining at least one task associated with the predetermined interrupt; and
   an interrupt handler stored in the system memory, the interrupt handler defining all tasks associated with the predetermined interrupt except the at least one task;
   wherein when the predetermined interrupt occurs, the micro interrupt handler and the interrupt handler are called sequentially by the processing unit, and
   wherein when the processing unit receives the predetermined interrupt while executing an existing task, the processing unit:
      writes a portion of the existing task to the system memory;
      reads the micro interrupt handler associated with the predetermined interrupt from system memory;
      writes a remaining portion of the existing task to the system memory;

executes the tasks defined in the micro interrupt handler in parallel with writing the remaining portion of the existing task to the system memory;
reads the interrupt handler associated with the predetermined interrupt from memory; and
executes the tasks defined in the interrupt handler.

2. The system as claimed in claim 1, wherein the micro interrupt handler is smaller than the interrupt handler.

3. The system as claimed in claim 1, wherein the micro interrupt handler comprises a plurality of micro interrupt handlers and when the processing unit receives the predetermined interrupt while executing an existing task, the processing unit determines which one of the plurality of micro interrupt handlers is associated with the received interrupt.

4. The system of claim 1, wherein the interrupt handler comprises a plurality of interrupt handlers, and wherein the processing unit determines which one of the plurality of micro interrupt handlers is associated with the received predetermined interrupt and determines which one of the plurality of interrupt handlers is associated with the received predetermined interrupt.

5. The system of claim 4, wherein the processing unit determines which one of the plurality of micro interrupt handlers and which one of the plurality of interrupt handlers are associated with the received predetermined interrupt via a lookup table.

6. The system of claim 1, wherein the micro interrupt handler does not call the interrupt handler.

7. A system for handling a plurality of interrupts, comprising:
a system memory;
a processing unit in communication with the system memory, the processing unit having an interrupt channel;
a plurality of micro interrupt handlers, each of the plurality of micro interrupt handlers being associated with one of the plurality of interrupts, each of the plurality of micro interrupt handlers being stored in the system memory and each of the plurality of micro interrupt handlers defining at least one task associated with the associated interrupt; and
a plurality of interrupt handlers, each of the interrupt handlers being associated with one of the plurality of interrupts, each of the plurality of interrupt handlers being stored in the system memory and each of plurality of interrupt handlers defining all tasks associated with the predetermined interrupt except the at least one task;
wherein when the processing unit receives one of the plurality of interrupts while executing an existing task, the processing unit:
writes a portion of the existing task to the system memory;
determines which one of the plurality of micro interrupt handlers is associated with the received interrupt;
reads the micro interrupt handler associated with the received interrupt from system memory;
writes a remaining portion of the existing task to the system memory;
executes the tasks defined in the micro interrupt handler in parallel with writing the remaining portion of the existing task to the system memory;
reads the interrupt handler associated with the received interrupt from memory; and
executes the tasks defined in the interrupt handler.

8. A method of handling an interrupt in a system having a processor, the processor having access to a system memory that stores a micro interrupt handler associated with the interrupt and an interrupt handler associated with the interrupt, the micro interrupt handler defining at least one task associated with the interrupt and the interrupt handler defining remaining tasks associated with the interrupt, comprising the steps of:
receiving an interrupt at the processor;
reading the micro interrupt handler associated with the predetermined interrupt from system memory;
writing a remaining portion of an existing task to the system memory;
executing the tasks defined in the micro interrupt handler in parallel with writing the remaining portion of the existing task to the system memory;
reading the interrupt handler associated with the predetermined interrupt from system memory; and
executing the tasks defined in the interrupt handler.

9. The method as claimed in claim 8, wherein the micro interrupt handler is smaller than the interrupt handler.

10. A method of handling a plurality of interrupts in a system having a plurality of processors, each of the plurality of processors having access to a system memory that stores a plurality of micro interrupt handlers and a plurality of interrupt handlers, each of the plurality of micro interrupt handlers and the plurality of interrupt handlers being associated with the interrupt, each of the plurality of the micro interrupt handlers defining at least one task relating to the associated interrupt and each of the plurality of interrupt handlers defining remaining tasks relating to the associated interrupt, comprising the steps of:
receiving an interrupt at one of the plurality of processors;
determining which one of the plurality of micro interrupt handlers is associated with the received interrupt;
reading the micro interrupt handler associated with the received interrupt from system memory;
writing a remaining portion of an existing task to the system memory;
executing the tasks defined in the micro interrupt handler in parallel with writing the remaining portion of the existing task to the system memory;
reading the interrupt handler associated with the received interrupt from system memory; and
executing the tasks defined in the interrupt handler.

11. The method as claimed in claim 10, further comprising the step of the processor receiving the interrupt writing a portion of the existing task to the system memory.

12. The method as claimed in claim 10, wherein the micro interrupt handler is smaller than the interrupt handler.

13. A method of handling a plurality of interrupts in a system having a processor, the processor having access to a system memory that stores a plurality of micro interrupt handlers and a plurality of interrupt handlers, each of the plurality of micro interrupt handlers and the plurality of interrupt handlers being associated with the interrupt, each of the plurality of the micro interrupt handlers defining at least one task relating to the associated interrupt and each of the plurality of interrupt handlers defining remaining tasks relating to the associated interrupt, comprising the steps of:
writing a portion of the existing task to the system memory;
determining which one of the plurality of micro interrupt handlers is associated with the received interrupt;
reading the micro interrupt handler associated with the received interrupt from system memory;
writing a remaining portion of the existing task to the system memory;
executing the tasks defined in the micro interrupt handler in parallel with writing the remaining portion of the existing task to the system memory;

reading the interrupt handler associated with the received interrupt from memory; and executing the tasks defined in the interrupt handler.

14. A server computer including a plurality of processor elements and a plurality of processor units, at least one of said processor elements including an interrupt handling system comprising:

a plurality of subprocessing units;

a memory;

an interrupt channel;

a micro interrupt handler stored in said memory, providing a minimum amount of computer code necessary to un block an interrupt channel, wherein said micro interrupt handler is copied to an assigned sub-processing unit from one of said plurality of subp-rocessing units in connection with receipt of an interrupt signal by said assigned subprocessing unit;

an interrupt handler task remaining portion, said interrupt handler task remaining portion and said micro interrupt handler defining an entire interrupt task;

a plurality of direct memory access channels; and a sub-processing unit task to be carried out by said assigned sub-processing unit prior to the receipt of said interrupt signal;

wherein said system is operable to save said sub-processing unit task in said memory by using said plurality of direct memory access channels, save said micro interrupt handler to said assigned subprocessing unit using one of said plurality of direct memory access channels, execute said micro interrupt handler and execute said interrupt handler task remaining portion, and wherein when the assigned sub-processing unit receives the interrupt signal while executing the subprocessing unit task, the system:

writes a portion of the sub-processing unit task to the memory;

reads the micro interrupt handler associated with the interrupt signal from the memory;

writes a remaining portion of the sub-processing unit task to the memory; and executes any tasks defined in the micro interrupt handler in parallel with writing the remaining portion of the sub-processing unit task to the memory.

15. A client computer including a plurality of processor elements having a plurality of processor units, at least one of said processor elements including an interrupt handling system comprising:

a plurality of sub-processing units;

a memory;

an interrupt channel;

a micro interrupt handler written to said memory, providing a minimum amount of computer code necessary to un-block an interrupt channel, wherein said micro interrupt handler is copied to an assigned sub-processing unit from one of said plurality of sub-processing units in connection with receipt of an interrupt signal by said assigned sub-processing unit;

an interrupt handler task remaining portion, said interrupt handler task remaining portion and said micro interrupt handler defining an entire interrupt task;

a plurality of direct memory access channels; and a sub-processing unit task to be carried out by said assigned sub-processing unit prior to the receipt of said interrupt signal;

wherein said system, is operable to save said sub-processing unit task in said memory by using said plurality of direct memory access channels, save said micro interrupt handler to said assigned sub-processing unit using one of said plurality of direct memory access channels, execute said micro interrupt handler and execute said interrupt handler task remaining portion, and wherein when the assigned sub-processing unit receives the interrupt signal while executing the sub-processing unit task, the system:

writes a portion of the sub-processing unit task to the memory;

reads the micro interrupt handler associated with the interrupt signal from the memory;

writes a remaining portion of the sub-processing unit task to the memory; and executes any tasks defined in the micro interrupt handler in parallel with writing the remaining portion of the sub-processing unit task to the memory.

16. An electronic device operable to be connected to a network, selected from the group consisting of a personal digital assistant, a digital television a wired computer, a wireless computer, and combinations thereof, including a plurality of processor elements having a plurality of processor units, at least one of said processor elements including an interrupt handling system comprising:

a plurality of sub-processing units;

a memory;

an interrupt channel;

a micro interrupt handler written to said memory, providing a minimum amount of computer code necessary to unblock an interrupt channel, wherein said micro interrupt handler is copied to an assigned sub-processing unit from one of said plurality of sub-processing units in connection with receipt of an interrupt signal by said assigned sub-processing unit;

an interrupt handler task remaining portion, said interrupt handler task remaining portion and said micro interrupt handler defining an entire interrupt task;

a plurality of direct memory access channels; and a sub-processing unit task to be carried out by said assigned sub-processing unit prior to the receipt of said interrupt signal;

wherein said system is operable to save said sub- processing unit task in said memory by using said plurality of direct memory access channels, save said micro interrupt handler to said assigned sub-processing unit using one of said plurality of direct memory access channels, execute said micro interrupt handler and execute said interrupt handler task remaining portion, and wherein when the assigned sub-processing unit receives the interrupt signal while executing the sub-processing unit task, the system:

writes a portion of the sub-processing unit task to the memory;

reads the micro interrupt handler associated with the interrupt signal from the memory;

writes a remaining portion of the sub-processing unit task to the memory; and executes any tasks defined in the micro interrupt handler in parallel with writing the remaining portion of the sub-processing unit task to the memory.

17. A method of interrupt handling for a computer system including a plurality of sub-processing units, the method comprising:

saving a task running on said sub-processing unit prior to said sub-processing unit receiving said interrupt signal;

saving a micro interrupt handler, using a first direct memory access channel, to an assigned sub-processing unit in connection with said sub-processing unit receiving an interrupt signal, said micro interrupt handler including a minimum amount of computer code necessary to unblock an interrupt channel;

saving an interrupt handler task remaining portion to memory;

executing said micro interrupt handler in parallel with saving the interrupt handler task remaining portion to the memory; and executing said interrupt handler task remaining portion.

18. A method of interrupt handling for a computer system as recited in claim 17, wherein saving said task running on said sub-processing unit includes saving a first part of said task running on said sub-processor unit using a second direct memory access channel.

19. A method of interrupt handling as recited in claim 18, wherein said first part of said task running on said sub-processor includes the processor word status and the program counter.

* * * * *

UNITED STATES PATENT AND TRADEMARK OFFICE
CERTIFICATE OF CORRECTION

| | | |
|---|---|---|
| PATENT NO. | : 7,680,972 B2 | Page 1 of 2 |
| APPLICATION NO. | : 11/345893 | |
| DATED | : March 16, 2010 | |
| INVENTOR(S) | : Keisuke Inoue and Masahiro Yasue | |

It is certified that error appears in the above-identified patent and that said Letters Patent is hereby corrected as shown below:

Col. 1, Line 24, "includes within" should read -- includes, within --.
Col. 1, Line 66, "tasks, receives" should read -- tasks receives --.
Col. 2, Line 10, "(necessary" should read -- necessary --.
Col. 2, Line 50, "include" should read -- includes --.
Col. 2, Line 61, "Is block" should read -- is a block --.
Col. 3, Line 4, "stand alone" should read -- stand-alone --.
Col. 3, Lines 16-18, delete "FIGS. 10 to 12 illustrate the interrupt processing steps in accordance with one aspect of the present invention;".
Col. 4, Line 13, "constructed, as" should read -- constructed as --.
Col. 5, Line 17, "line" should read -- lines --.
Col. 5, Line 38, "are" should read -- is --.
Col. 5, Line 57, "perform" should read -- performs --.
Col. 6, Line 7, "processing unit 102B" should read -- processing units 102B --.
Col. 6, Line 39, "units," should read -- units --.
Col. 6, Line 54, "stand alone" should read -- stand-alone --.
Col. 6, Line 63, "stand alone" should read -- stand-alone --.
Col. 8, Line 4, "provides" should read -- provide --.
Col. 8, Line 31, "channel," should read -- channel --.
Col. 8, Line 55, "contain" should read -- contains --.
Col. 9, Line 3, "accordance one" should read -- accordance with one --.
Col. 9, Lines 37-38, "tasks-necessary" should read -- tasks necessary --.
Col. 9, Line 49, "look up" should read -- look-up --.
Col. 11, Line 19, "services Normally," should read -- services. Normally, --.
Col. 12, Line 31, "read, the" should read -- read the --.
Col. 13, Claim 5, Line 26, "lookup" should read -- look-up --.
Col. 13, Claim 7, Line 45, "of plurality" should read -- of the plurality --.
Col. 15, Claim 14, Line 8, "subprocessing" should read -- sub-processing --.
Col. 15, Claim 14, Lines 12-13, "unblock" should read -- un-block --.
Col. 15, Claim 14, Line 15, "subp-rocessing" should read -- sub-processing --.

Signed and Sealed this
Nineteenth Day of June, 2012

David J. Kappos
*Director of the United States Patent and Trademark Office*

CERTIFICATE OF CORRECTION (continued)

U.S. Pat. No. 7,680,972 B2

Col. 15, Claim 14, Line 17, "subprocessing" should read -- sub-processing --.
Col. 15, Claim 14, Line 28, "subprocessing" should read -- sub-processing --.
Col. 15, Claim 14, Line 33, "subprocessing" should read -- sub-processing --.
Col. 15, Claim 15, Line 65, "system, is" should read -- system is --.
Col. 16, Claim 16, Line 19, "television a" should read -- television, a --.
Col. 16, Claim 16, Line 29, "unblock" should read -- un-block --.
Col. 17, Claim 17, Line 3, "unblock" should read -- un-block --.